US00RE49279E

(19) United States
(12) Reissued Patent
Abadjian

(10) Patent Number: US RE49,279 E
(45) Date of Reissued Patent: Nov. 8, 2022

(54) FOOTWEAR

(71) Applicant: Crocs, Inc., Broomfield, CO (US)

(72) Inventor: Joseph Abadjian, Longmont, CO (US)

(73) Assignee: CROCS, INC., Broomfield, CO (US)

(21) Appl. No.: 29/804,027

(22) Filed: Aug. 17, 2021

Related U.S. Patent Documents

Reissue of:
(64) Patent No.: Des. 856,642
Issued: Aug. 20, 2019
Appl. No.: 29/590,088
Filed: Jan. 6, 2017

U.S. Applications:
(63) Continuation of application No. 29/801,380, filed on Jul. 28, 2021, which is an application for the reissue of Pat. No. Des. 856,642.

(51) LOC (13) Cl. ..... 02-04
(52) U.S. Cl.
USPC ..... D2/923; D2/916
(58) Field of Classification Search
USPC ..... D2/896, 900, 916, 917, 923, 943, 946, D2/969, 972, 976
CPC ..... A43B 1/0081; A43B 1/14; A43B 3/0042; A43B 7/06; A43B 7/08
See application file for complete search history.

(56) References Cited

U.S. PATENT DOCUMENTS 5,369,895 A 12/1994 Hammerschmidt
D381,794 S 8/1997 Gelli
5,852,885 A 12/1998 Ferniani
D517,789 S 3/2006 Seamans
D529,263 S * 10/2006 Wolf ..... D2/923
D532,590 S * 11/2006 Belley ..... D2/969
7,140,129 B2 * 11/2006 Newson ..... A43B 3/244 36/3 R
D535,088 S 1/2007 Seamans
D543,341 S 5/2007 Seamans
D543,681 S 6/2007 McCarthy
D545,032 S 6/2007 Wolf
D545,033 S 6/2007 Wolf
D549,434 S 8/2007 Seamans
D554,847 S 11/2007 Schmelzer et al.
D564,206 S 3/2008 Seamans
D564,207 S 3/2008 Seamans
D564,208 S 3/2008 Seamans
D564,749 S 3/2008 Seamans
D567,483 S 4/2008 Liow
D575,480 S * 8/2008 Zimmerman ..... D2/896
D575,499 S 8/2008 Seamans
D584,037 S 1/2009 del Biondi et al.
D588,346 S 3/2009 McCarthy
D590,588 S 4/2009 del Biondi et al.
D599,538 S 9/2009 del Biondi et al.
D610,784 S * 3/2010 Del Biondi ..... D2/916
D613,485 S * 4/2010 Meador ..... D2/919
D624,733 S 10/2010 O'Boyle et al.
D632,465 S 2/2011 del Biondi et al.
D637,382 S 5/2011 Bathum
D642,773 S 8/2011 Liow
D650,157 S * 12/2011 Liow ..... D2/923
D664,753 S 8/2012 Santos
D667,612 S 9/2012 Del Biondi et al.
D671,720 S 12/2012 Callegarini et al.
D676,223 S * 2/2013 Dill ..... D2/942
D677,449 S 3/2013 del Biondi
D677,868 S 3/2013 Kue
D689,677 S 9/2013 Bathum et al.
D690,488 S * 10/2013 Reed ..... D2/942
D691,351 S 10/2013 Pugazhenthi
D694,994 S 12/2013 Santos
D694,997 S 12/2013 Del Biondi
D698,131 S 1/2014 Del Biondi et al.
D698,133 S 1/2014 Callegarini et al.
D698,531 S 2/2014 Lock et al.
D708,826 S 7/2014 Fongher et al.
D708,827 S 7/2014 Kue
D709,272 S 7/2014 Del Biondi et al.
D709,677 S 7/2014 del Biondi
D717,026 S 11/2014 Del Biondi
D718,518 S 12/2014 Del Biondi et al.
D720,920 S 1/2015 Santos
D721,473 S 1/2015 Kue
D722,747 S 2/2015 Kue
8,991,071 B2 3/2015 Bathum et al.
D726,397 S 4/2015 Del Biondi et al.
D728,204 S 5/2015 Fongher
D731,760 S 6/2015 Fongher
D732,804 S 6/2015 Fongher et al.
D732,808 S 6/2015 Del Biondi et al.
D735,983 S 8/2015 Cietto (AMENDED)

| | | | | | |
|---|---|---|---|---|---|
| D739,125 | S | | 9/2015 | Chanthavong | |
| D739,126 | S | | 9/2015 | Fongher et al. | |
| D739,129 | S | | 9/2015 | Del Biondi | |
| D739,131 | S | | 9/2015 | Del Biondi | |
| D739,132 | S | | 9/2015 | Del Biondi | |
| D739,998 | S | | 10/2015 | Thompson et al. | |
| D741,053 | S | | 10/2015 | Fongher et al. | |
| D741,581 | S | | 10/2015 | Del Biondi | |
| D746,557 | S | | 1/2016 | Engerman | |
| D751,798 | S | | 3/2016 | Laska | |
| 9,282,787 | B2 | | 3/2016 | Ferniani et al. | |
| D752,848 | S | | 4/2016 | Santos | |
| D753,377 | S | * | 4/2016 | Bigolin | D2/907 |
| D760,484 | S | | 7/2016 | Del Biondi et al. | |
| D763,555 | S | | 8/2016 | Engerman | |
| D768,364 | S | | 10/2016 | Chanthavong et al. | |
| D768,365 | S | * | 10/2016 | Thompson | D2/923 |
| D769,587 | S | | 10/2016 | Chanthavong et al. | |
| D771,917 | S | * | 11/2016 | Del Biondi | D2/923 |
| D771,918 | S | | 11/2016 | Engerman | |
| D772,543 | S | | 11/2016 | Laska | |
| D779,794 | S | | 2/2017 | Engerman | |
| D787,789 | S | * | 5/2017 | Del Biondi | D2/923 |
| D796,798 | S | | 9/2017 | Thompson | |
| D801,011 | S | * | 10/2017 | Del Biondi | D2/916 |
| D801,013 | S | | 10/2017 | Laska et al. | |
| D802,904 | S | * | 11/2017 | Del Biondi | D2/972 |
| D804,155 | S | * | 12/2017 | Tzenos | D2/923 |
| D808,134 | S | | 1/2018 | Laska | |
| D809,753 | S | * | 2/2018 | Carroll | D2/923 |
| D812,870 | S | | 3/2018 | Laska | |
| 9,918,520 | B2 | | 3/2018 | Lambert et al. | |
| D821,079 | S | * | 6/2018 | Abadjian | D2/961 |
| D825,899 | S | | 8/2018 | Engerman | |
| D827,991 | S | | 9/2018 | Engerman et al. | |
| 10,065,384 | B2 | | 9/2018 | Ferniani et al. | |
| D830,674 | S | | 10/2018 | Thompson | |
| D830,675 | S | * | 10/2018 | Del Biondi | D2/896 |
| D833,124 | S | | 11/2018 | Laska | |
| D833,125 | S | | 11/2018 | Laska et al. | |
| D833,126 | S | | 11/2018 | Laska | |
| D833,720 | S | | 11/2018 | Laska et al. | |
| D843,090 | S | | 3/2019 | Fongher | |
| D843,697 | S | | 3/2019 | Fongher | |
| D846,868 | S | | 4/2019 | Chanthavong | |
| D856,642 | S | * | 8/2019 | Abadjian | D2/916 |
| D859,797 | S | | 9/2019 | Chanthavong | |
| D865,337 | S | | 11/2019 | Laska | |
| D869,137 | S | | 12/2019 | Fongher et al. | |
| D869,826 | S | | 12/2019 | Chanthavong | |
| D873,544 | S | | 1/2020 | Fongher et al. | |
| D874,797 | S | * | 2/2020 | Fongher | D2/923 |
| D874,799 | S | | 2/2020 | Laska | |
| D876,051 | S | * | 2/2020 | Abadjian | D2/916 |
| 10,561,197 | B2 | * | 2/2020 | Darby, II | A43B 3/24 |
| D884,320 | S | | 5/2020 | Fongher et al. | |
| D894,546 | S | * | 9/2020 | Velez | D2/923 |
| D895,943 | S | | 9/2020 | Fongher et al. | |
| D905,413 | S | * | 12/2020 | Del Biondi | D2/972 |
| D909,027 | S | * | 2/2021 | Fongher | D2/923 |
| D909,717 | S | * | 2/2021 | Mayhew | D2/916 |
| D910,286 | S | | 2/2021 | Maritan et al. | |
| D910,287 | S | | 2/2021 | Fongher et al. | |
| D910,288 | S | | 2/2021 | Funck | |
| 10,959,485 | B2 | * | 3/2021 | Bathum | A43B 3/128 |
| D919,253 | S | | 5/2021 | Maritan et al. | |
| D919,254 | S | * | 5/2021 | Del Biondi | D2/916 |
| D919,255 | S | | 5/2021 | Mayhew | |
| D919,256 | S | | 5/2021 | Thompson | |
| D921,340 | S | | 6/2021 | Funck et al. | |
| D921,341 | S | * | 6/2021 | Chen | D2/923 |
| 11,224,263 | B2 | * | 1/2022 | Darby | A43B 13/188 |
| 2012/0186103 | A1 | | 7/2012 | Lambert et al. | |
| 2013/0118037 | A1 | | 5/2013 | Bathum et al. | |
| 2013/0145651 | A1 | | 6/2013 | Bathum et al. | |
| 2016/0114547 | A1 | | 4/2016 | Ferniani et al. | |
| 2020/0253335 | A1 | | 8/2020 | Heid | |

FOREIGN PATENT DOCUMENTS

| | | | |
|---|---|---|---|
| AR | 91.487 | | 3/2017 |
| AU | 2006230640 | A1 | 5/2007 |
| DE | 10234653 | B4 | 12/2005 |
| EP | 1624768 | A1 | 2/2006 |
| EP | 1929891 | A1 | 6/2008 |
| ES | 2372159 | T3 | 1/2012 |
| FR | 2495446 | A1 | 6/1982 |
| IN | 2160/DELNP/2013 | | 10/2014 |
| JP | 2007-117738 | A | 5/2007 |
| JP | 5075391 | B2 | 11/2012 |
| JP | 3221999 | U | 7/2019 |
| TW | M557529 | U | 4/2018 |
| WO | WO-2004/026062 | | 4/2004 |
| WO | WO-2004/105531 | A1 | 12/2004 |
| WO | WO-2005/104891 | | 11/2005 |
| WO | WO-2012/021421 | | 2/2012 |
| WO | WO-2012/118980 | | 9/2012 |
| WO | WO-2014/143732 | | 9/2014 |
| WO | WO-2014/143738 | | 9/2014 |
| WO | WO-2021/046406 | | 3/2021 |

OTHER PUBLICATIONS

Opposition dated Jun. 30, 2020, received against related Argentine Trademark Application No. 3826139 in Int. Class 25 filed by Evaplas S.A. in which opponent argues that the three-dimensional trademark application in Argentina is confusingly similar to industrial model No. 91.487, registered in the name of Evaplas S.A. (5 pages).

Opposition dated Feb. 5, 2020, filed by Evacol S.A.S. to the registration of the three-dimensional trademark Application No. SD2019/0081892 in Colombia (33 pages).

Opposition dated Dec. 20, 2019, filed by Stanton S.A.S. to the registration of the three-dimensional trademark Application No. SD2019/0081892 in Colombia (16 pages).

Opposition dated Sep. 23, 2019, filed by Industrias Humarsa E.I. R.L. to the registration of the three-dimensional Trademark Application No. 809508-2019 in Peru in Int. Class 25 (14 pages).

Office Action dated Feb. 18, 2020, received in related Mexican Trademark Registration No. 2193051 in Int. Class 25 (2 pages).

Opposition Brief filed on Oct. 30, 2019, filed by TA-TA S.A. to the registration of the three-dimensional Trademark Application No. 506.886 in Uruguay in Int. Class 25 (28 pages).

Trademark Registration No. P00276479 in Peru (2 pages).
Trademark Registration No. P00278271 in Peru (3 pages).
Trademark Registration No. P00242509 in Peru (2 pages).
Trademark Registration No. P00250814 in Peru (2 pages).
Trademark Registration No. P00262553 in Peru (2 pages).
Trademark Registration No. P00280890 in Peru (2 pages).
Trademark Registration No. P00211284 in Peru (2 pages).
Trademark Registration No. P00199917 in Peru (2 pages).
Trademark Registration No. 1624288 in Mexico (3 pages).
Trademark Registration No. 1785592 in Mexico (3 pages).
Trademark Registration No. 1785595 in Mexico (3 pages).
Trademark Registration No. 1785599 in Mexico (3 pages).
Trademark Registration No. 1785602 in Mexico (3 pages).
Trademark Registration No. 1785603 in Mexico (3 pages).
Trademark Registration No. 1845057 in Mexico (3 pages).
Trademark Registration No. 1932450 in Mexico (3 pages).
Trademark Registration No. 2014934 in Mexico (3 pages).
Trademark Registration No. 2087752 in Mexico (3 pages).

English translation of Opposition dated Feb. 5, 2020, filed by Evacol S.A.S. to the registration of the three-dimensional trademark Application No. SD2019/0081892 in Colombia (33 pages).

English translation of Opposition dated Dec. 20, 2019, filed by Stanton S.A.S. to the registration of the three-dimensional trademark Application No. SD2019/0081892 in Colombia (16 pages).

English translation of Opposition Brief filed on Oct. 30, 2019, filed by TA-TA S.A. to the registration of the three-dimensional Trademark Application No. 506.886 in Uruguay in Int. Class 25 (26 pages).

U.S. Appl. No. 29/554,122, filed Feb. 8, 2016.
U.S. Appl. No. 29/554,125, filed Feb. 8, 2016.
U.S. Appl. No. 29/554,126, filed Feb. 8, 2016.
U.S. Appl. No. 29/590,124, filed Jan. 6, 2017.

* cited by examiner

*Primary Examiner* — Darlington Ly
(74) *Attorney, Agent, or Firm* — Wilmer Cutler Pickering Hale and Dorr LLP

(57) CLAIM

The ornamental design for *a* footwear, as shown and described.

DESCRIPTION

*Notice: More than one reissue application has been filed for the reissue of Pat. No. D. 856,642 S. The reissue applications are application Ser. Nos. 29/801,380 (of which the present application is a reissue continuation), 29/804,025 (reissue continuation of application Ser. No. 29/801,380), and 29/804,027 (the present application), all of which are reissues of Pat. No. D. 856,642 S.*

*The present application is a reissue continuation of application Ser. No. 29/801,380, which is an application for reissue of U.S. Design Pat. No. D. 856,642 S, filed Jan. 6, 2017.*

FIG. 1 is a front perspective view of a [first embodiment of] footwear *embodying my new design*;

FIG. 2 is a front view of [the first embodiment of] footwear *embodying my new design*;

FIG. 3 is a back *elevation* view [of the first embodiment of footwear] *thereof*;

FIG. 4 is an outer side *elevation* view [of the first embodiment of footwear] *thereof*;

FIG. 5 is an inner side *elevation* view [of the first embodiment of footwear] *thereof*;

FIG. 6 is a top *plan* view [of the first embodiment of footwear] *thereof*; *and*

FIG. 7 is a bottom *plan* view [of the first embodiment of footwear] *thereof.*

Figure 8:
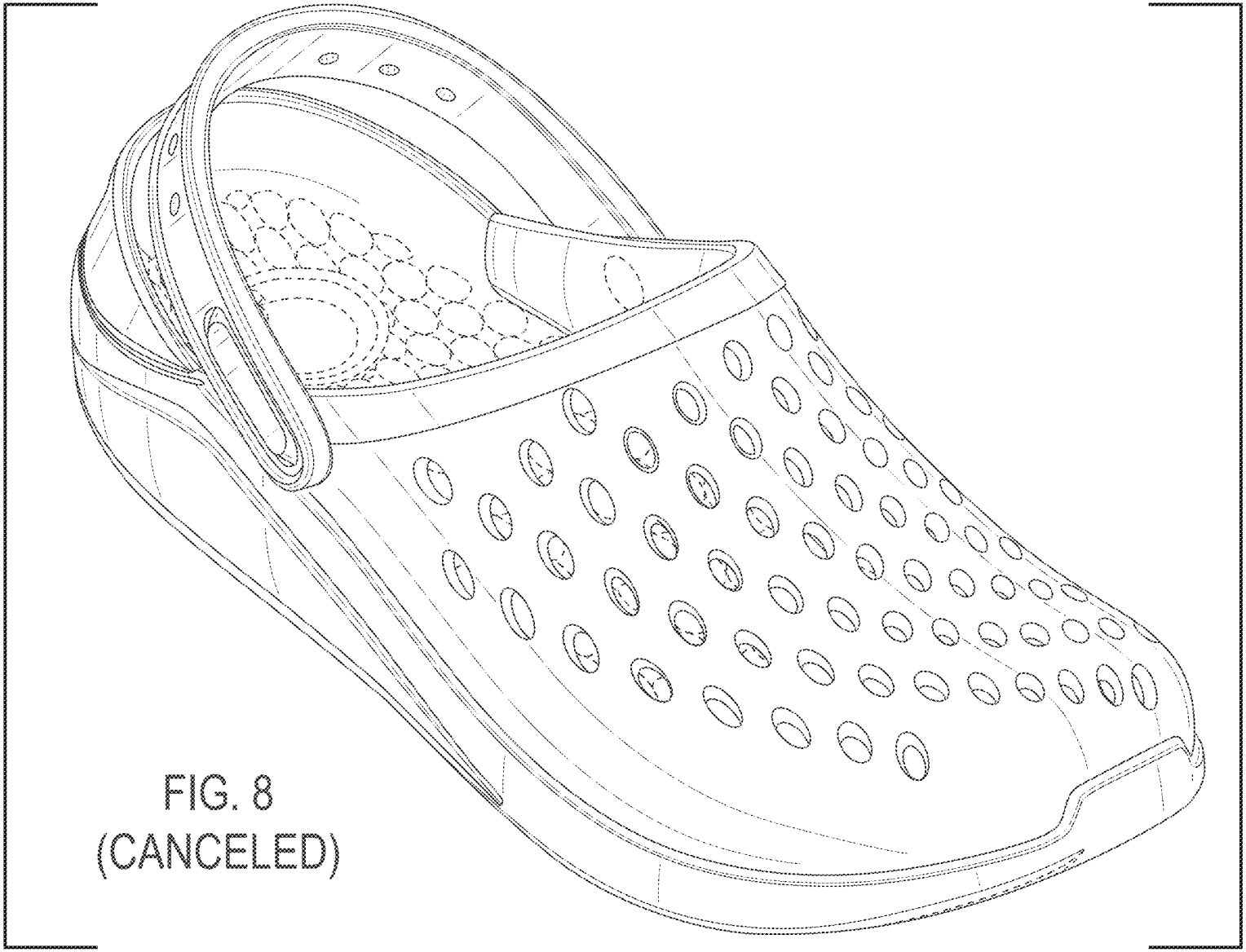
[FIG. 8 is a front perspective view of a second embodiment of footwear;]
Figure 9:
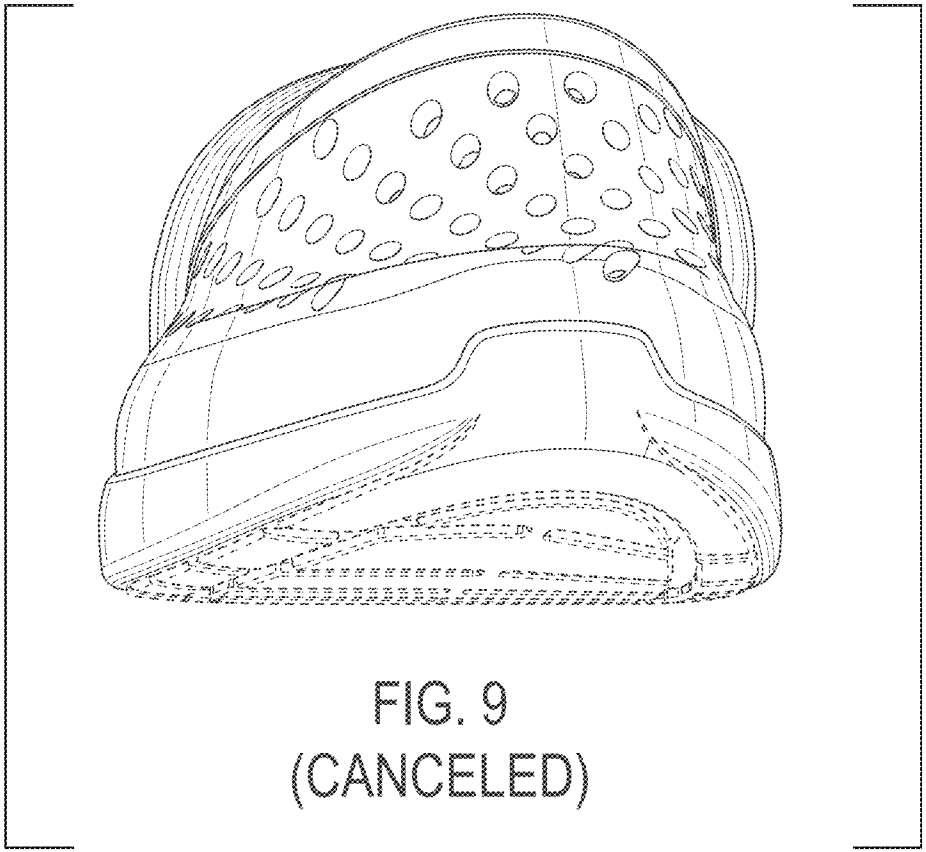
[FIG. 9 is a front view of the second embodiment of footwear;]
Figure 10:
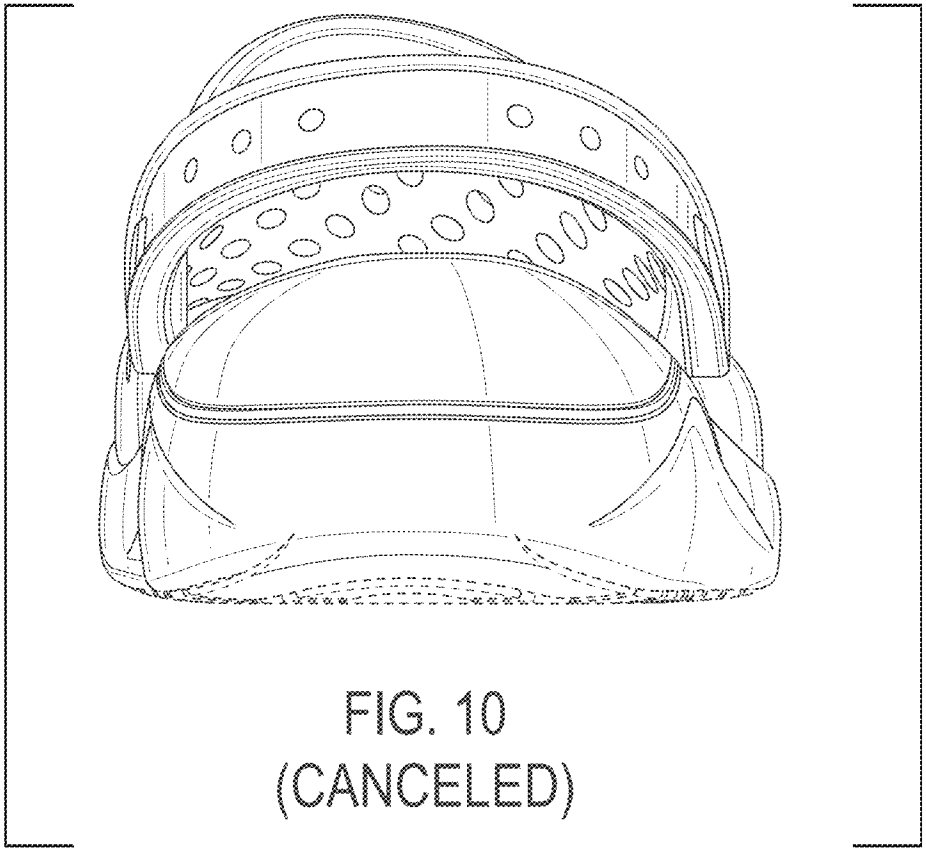
[FIG. 10 is a back view of the second embodiment of footwear;]
Figure 11:
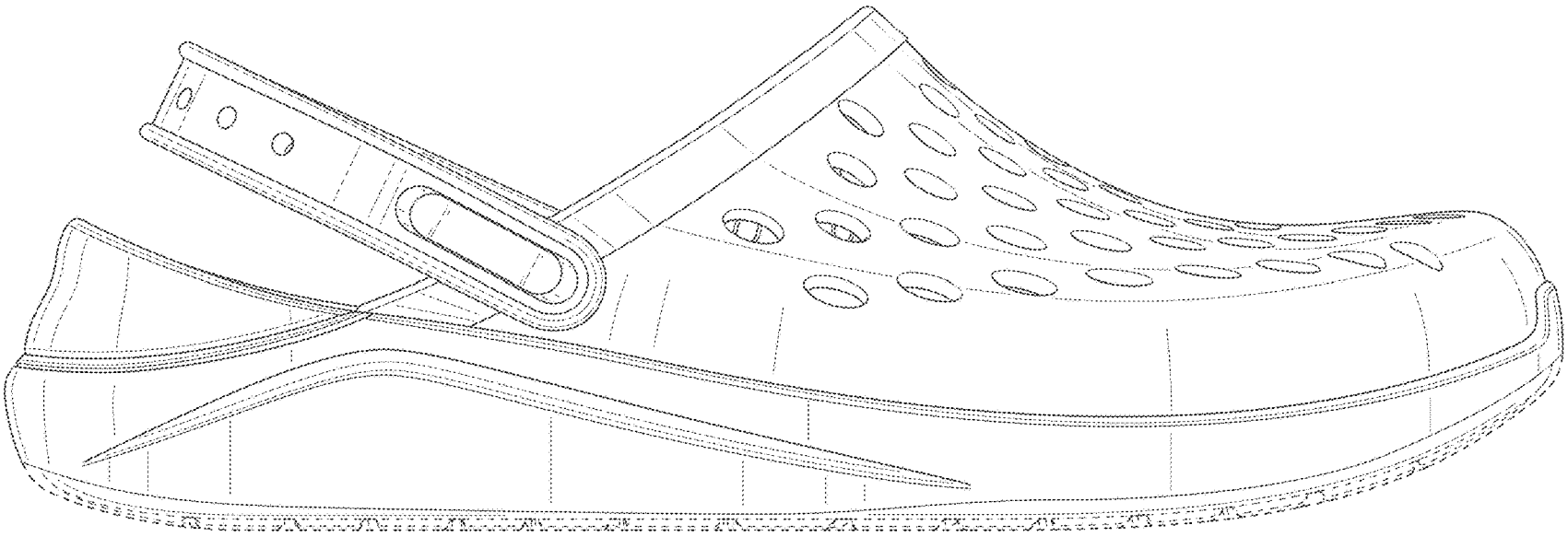
[FIG. 11 is an outer side view of the second embodiment of footwear;]
Figure 12:
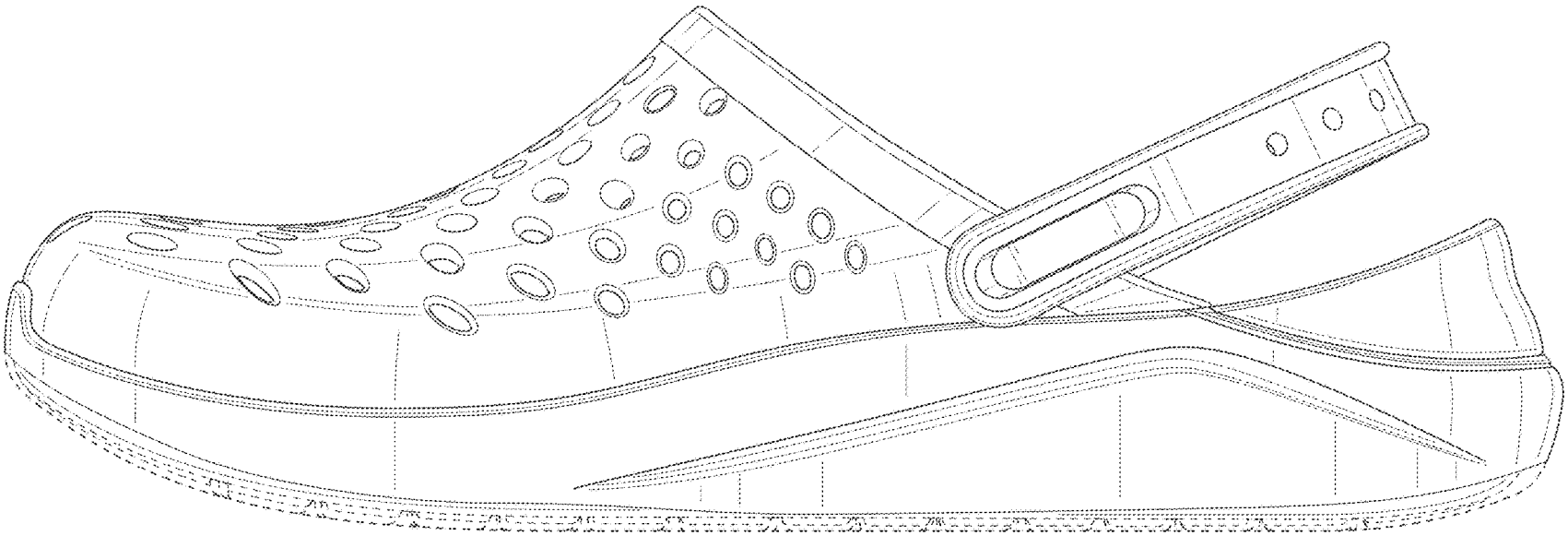
[FIG. 12 is an inner side view of the second embodiment of footwear;]
Figure 13:
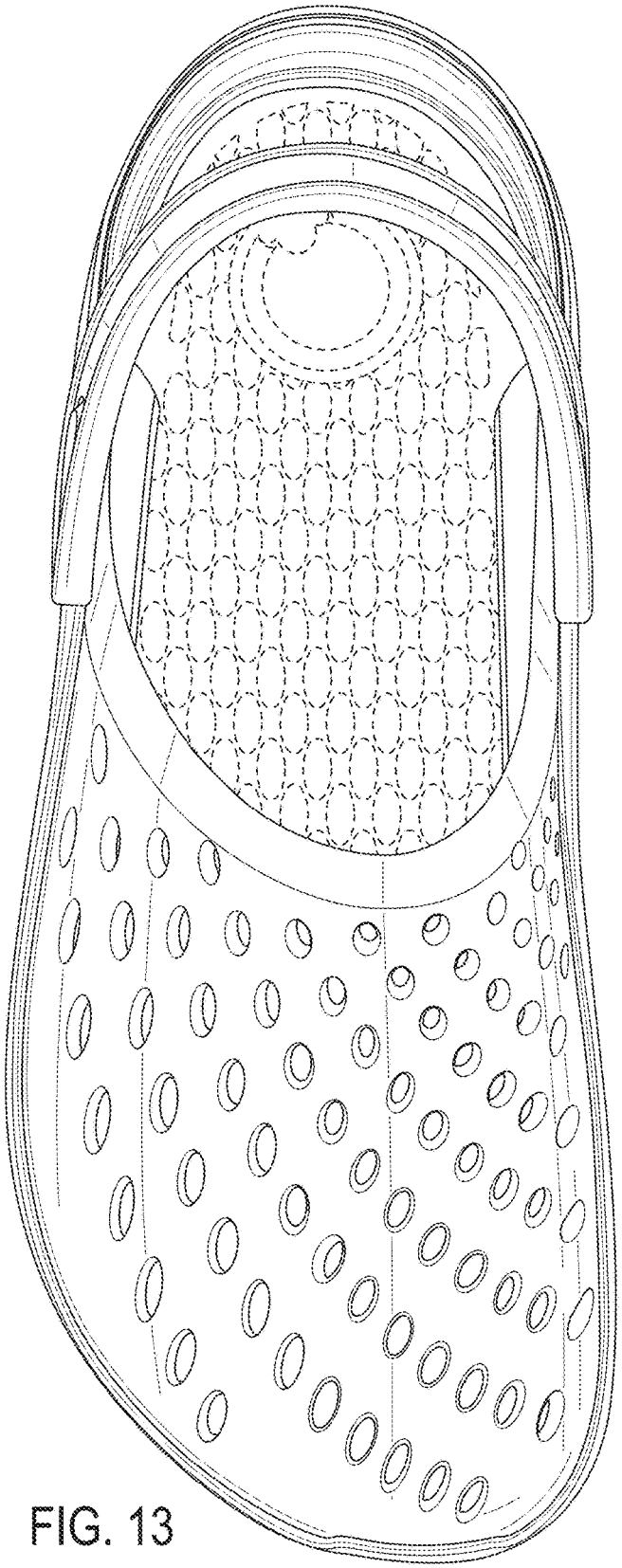
[FIG. 13 is a top view of the second embodiment of footwear; and,]
Figure 14:
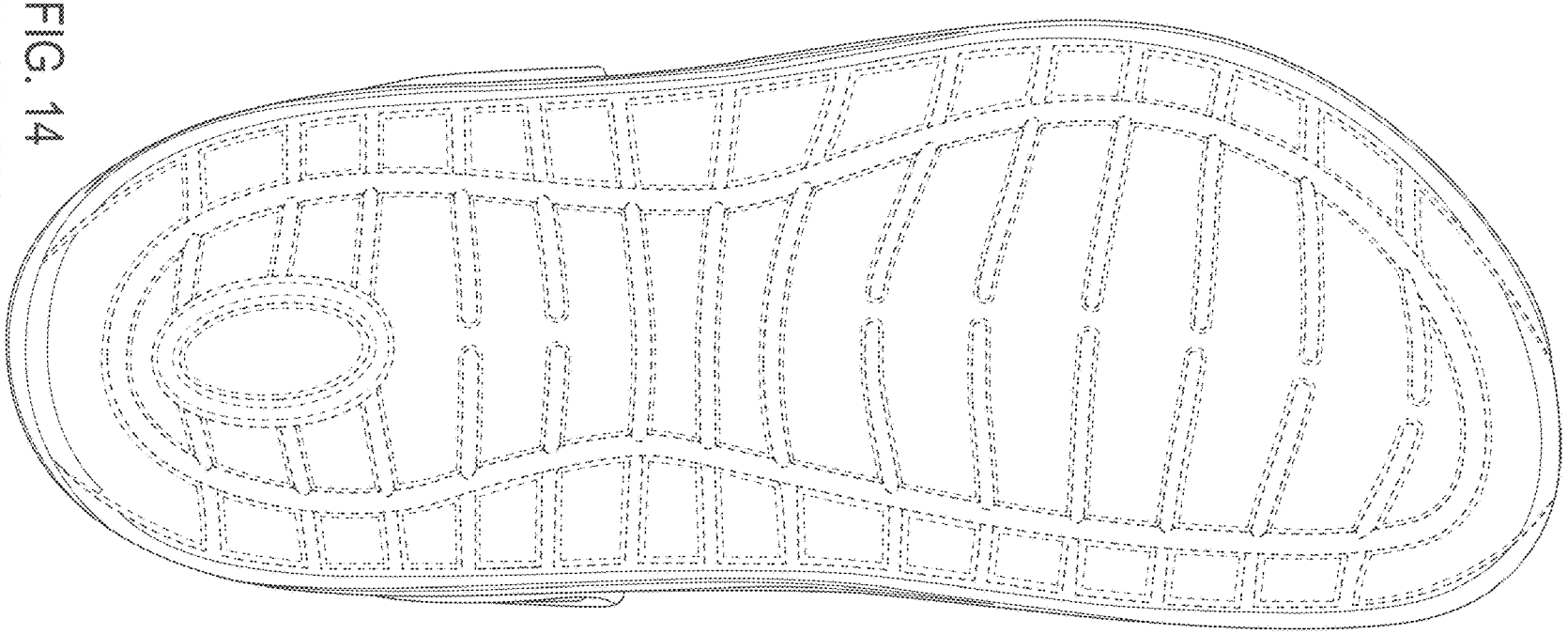
[FIG. 14 is a bottom view of the second embodiment of FOOTWEAR.]

The elements shown in [FIGS. 1-14] *the drawings* in broken lines represent portions that form no part of the claimed design.

1 Claim, 14 Drawing Sheets

Matter enclosed in heavy brackets [ ] appears in the original patent but forms no part of this reissue; matter printed in italics indicates the additions made by reissue.

REPLACEMENT SHEET
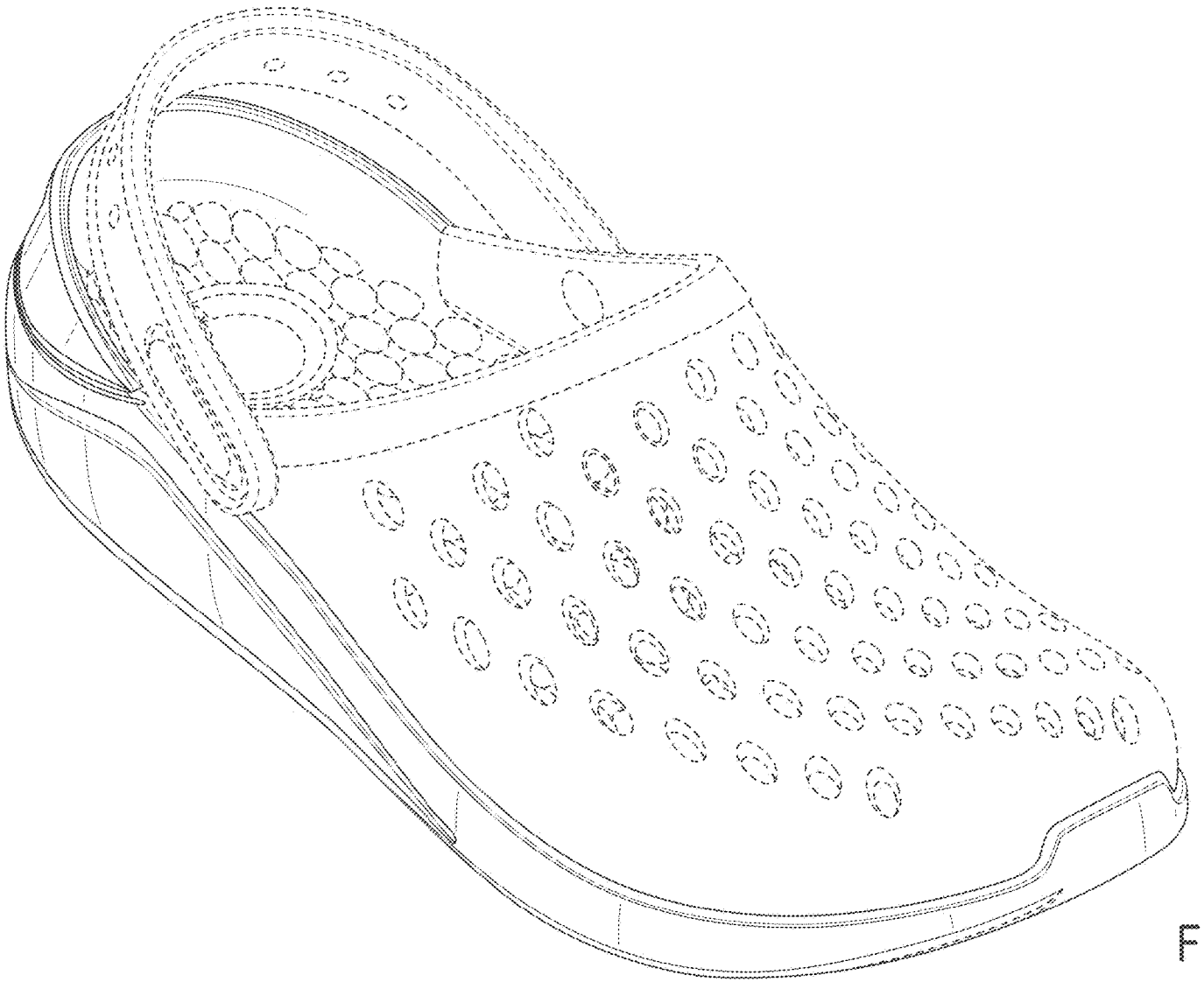
FIG. 1
(AMENDED)

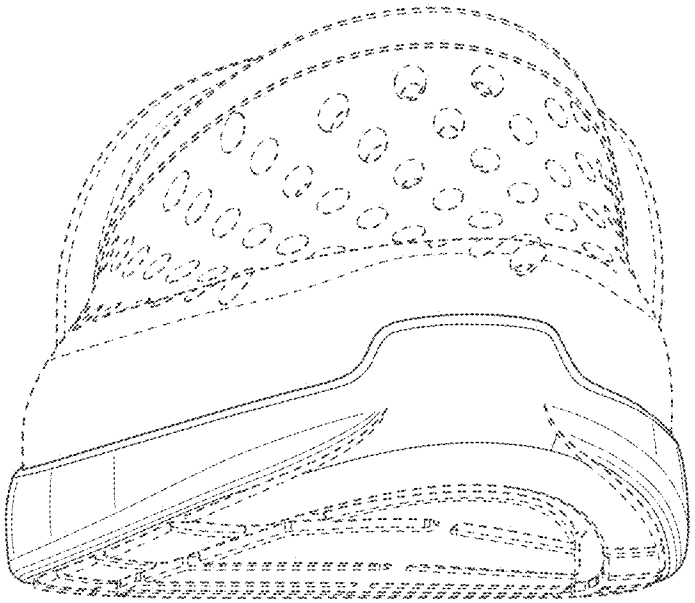
FIG. 2
(AMENDED)

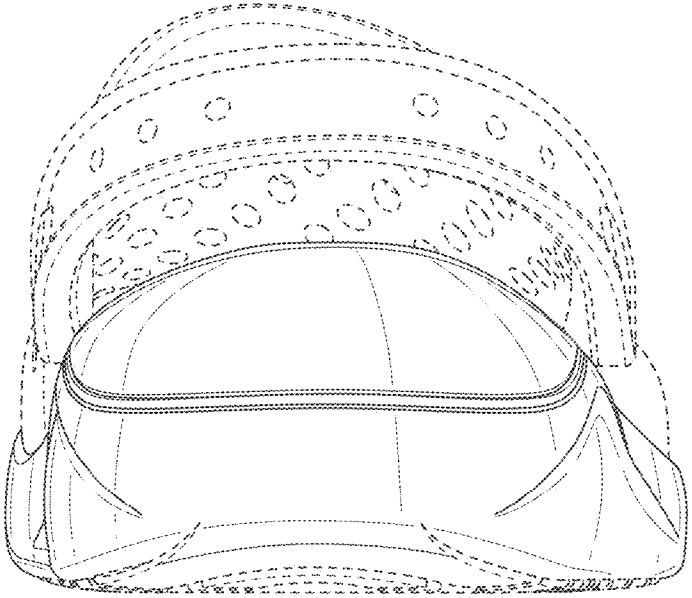
FIG. 3
(AMENDED)

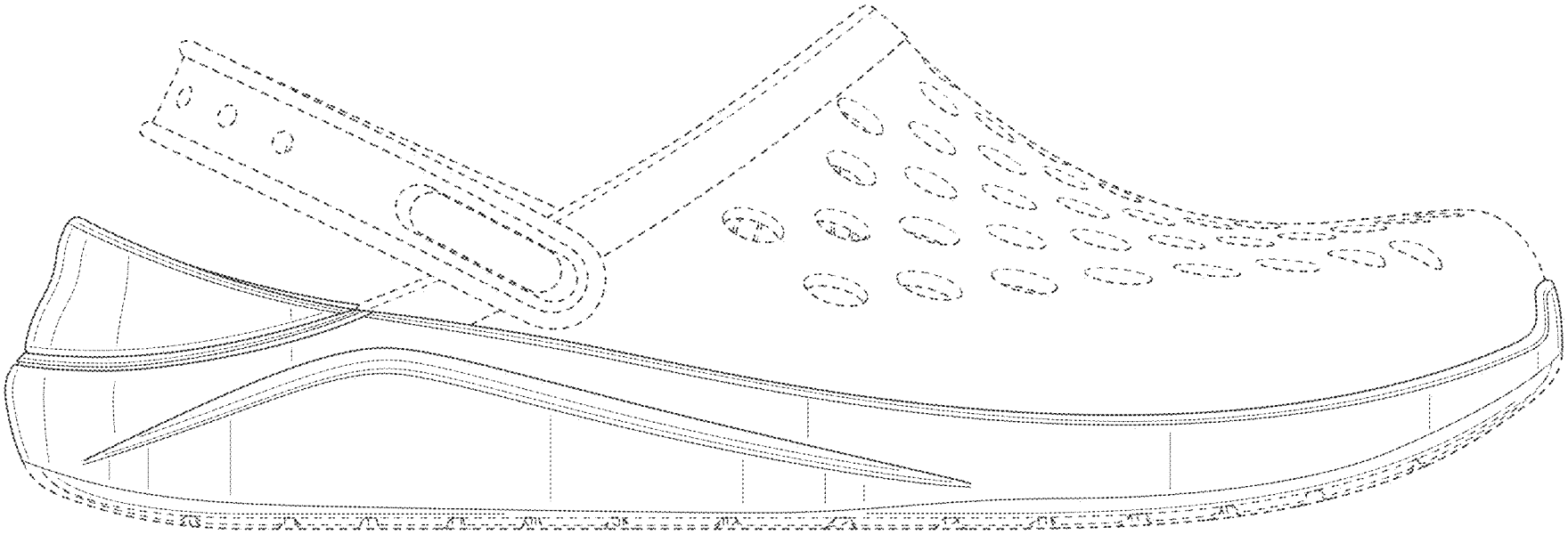
FIG. 4
(AMENDED)

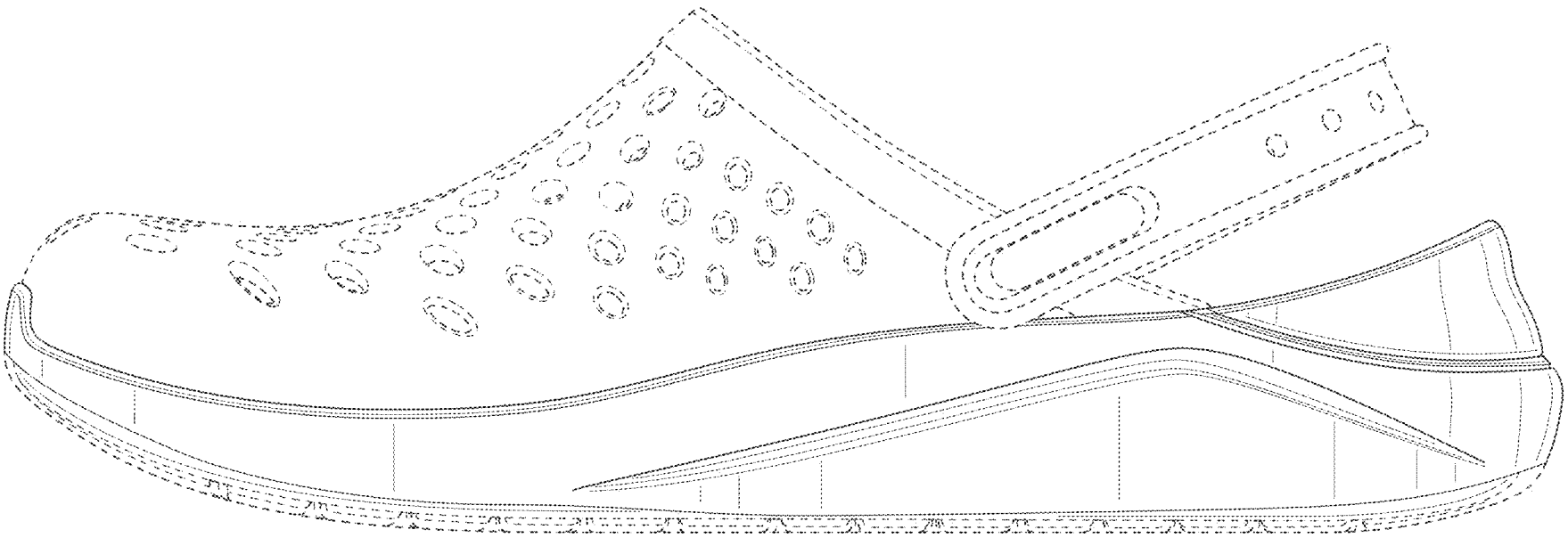
FIG. 5
(AMENDED)

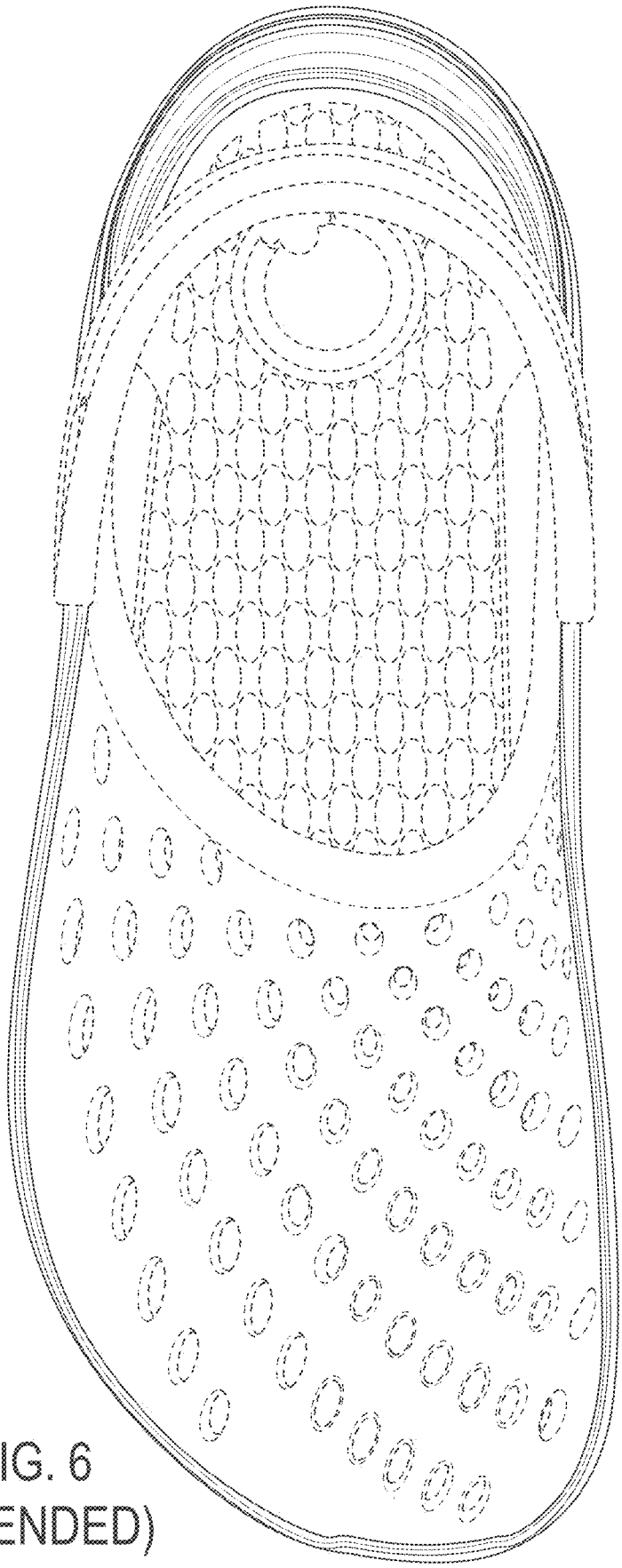
FIG. 6
(AMENDED)

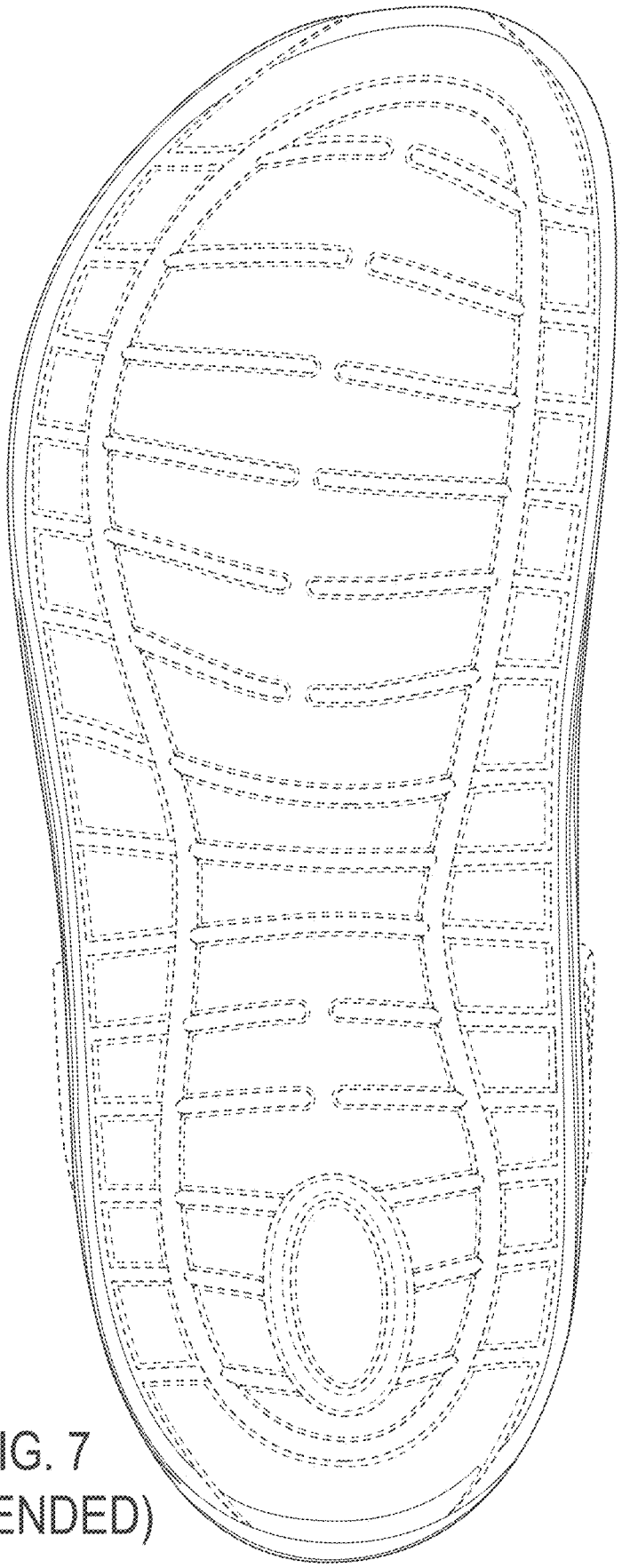
FIG. 7
(AMENDED)

(CANCELED)

(CANCELED)

(CANCELED)

(CANCELED)

(CANCELED)

(CANCELED)

(CANCELED)